United States Patent
Potschka

(10) Patent No.: US 8,210,307 B2
(45) Date of Patent: Jul. 3, 2012

(54) SONIC ABSORPTION DEVICE FOR AN AIR PIPELINE OF AN AIRCRAFT, IN PARTICULAR OF AN AIR CONDITIONING SYSTEM OF AN AIRCRAFT

(75) Inventor: Nikolai Potschka, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/428,864

(22) Filed: Apr. 23, 2009

(65) Prior Publication Data

US 2009/0200103 A1     Aug. 13, 2009

Related U.S. Application Data

(63) Continuation of application No. PCT/EP2007/061473, filed on Oct. 25, 2007.

(60) Provisional application No. 60/863,195, filed on Oct. 27, 2006.

(30) Foreign Application Priority Data

Oct. 27, 2006     (DE) .......................... 10 2006 050 869

(51) Int. Cl.
    *F02K 1/82*     (2006.01)
(52) U.S. Cl. ......... 181/224; 181/213; 181/222; 181/258
(58) Field of Classification Search .................. 181/213, 181/214, 224, 210, 217, 218, 219, 222, 225, 181/258, 290, 293, 286, 292; 244/1 N; 415/119
    See application file for complete search history.

(56) References Cited

U.S. PATENT DOCUMENTS

| | | | | |
|---|---|---|---|---|
| 3,187,835 | A * | 6/1965 | Smith | 181/217 |
| 3,568,791 | A * | 3/1971 | Luxton | 181/224 |
| 3,739,872 | A * | 6/1973 | McNair | 181/218 |
| 4,263,982 | A * | 4/1981 | Feuling | 181/256 |
| 5,495,754 | A | 3/1996 | Starr, Jr. et al. | |
| 5,700,527 | A * | 12/1997 | Fuchs et al. | 428/34.4 |
| 5,861,585 | A | 1/1999 | Van Every et al. | |
| 6,179,086 | B1 * | 1/2001 | Bansemir et al. | 181/292 |
| 6,715,580 | B1 * | 4/2004 | Gerstner et al. | 181/224 |
| 6,802,690 | B2 * | 10/2004 | Han et al. | 415/119 |
| 6,920,959 | B2 * | 7/2005 | Han et al. | 181/224 |

(Continued)

FOREIGN PATENT DOCUMENTS

DE     19730355 C1     3/1999

(Continued)

OTHER PUBLICATIONS

Micro Perforated Plate, Wikipedia Page, http://en.wikipedia.org/wiki/Micro_perforated_plate.*

(Continued)

*Primary Examiner* — Jeremy Luks
(74) *Attorney, Agent, or Firm* — Ingrassia Fisher & Lorenz P.C.

(57) ABSTRACT

A sonic absorption device for an air pipeline of an aircraft, which sonic absorption device comprises at least one curved pipe section whose respective interior wall is clad with a sound absorption material, wherein within the curved pipe section at least one air guidance means is arranged for a flow optimization, wherein for further weight-neutral sound absorption the air guidance means arranged within the curved pipe section comprises a microperforation on at least one side surface.

20 Claims, 1 Drawing Sheet

U.S. PATENT DOCUMENTS

| | | |
|---|---|---|
| 2002/0084138 A1 | 7/2002 | Weinstein |
| 2004/0099477 A1* | 5/2004 | Abom et al. .................. 181/286 |
| 2005/0098379 A1* | 5/2005 | Sato et al. .................... 181/293 |
| 2005/0211500 A1* | 9/2005 | Wendt et al. .................. 181/295 |

FOREIGN PATENT DOCUMENTS

| | | |
|---|---|---|
| EP | 0934876 A1 | 8/1999 |
| EP | 1319156 A1 | 6/2003 |
| EP | 1495885 A2 | 1/2005 |
| GB | 2250356 A | 6/1992 |
| GB | 2267359 A | 12/1993 |
| RU | 2186712 C2 | 8/2002 |
| RU | 2247878 C2 | 3/2005 |
| WO | 0223099 A1 | 3/2002 |

OTHER PUBLICATIONS

Russian Patent Office, Russian Notice of Allowance dated Jan. 23, 2012 for Russian Application No. 2009120098/06.

* cited by examiner

SONIC ABSORPTION DEVICE FOR AN AIR PIPELINE OF AN AIRCRAFT, IN PARTICULAR OF AN AIR CONDITIONING SYSTEM OF AN AIRCRAFT

CROSS-REFERENCE TO RELATED APPLICATION

This application is a continuation of International Application No. PCT/EP2007/061473, filed Oct. 25, 2007, which was published under PCT Article 21(2) and which claims priority to German Patent Application No. 102006050869.6 filed Oct. 27, 2006 and to U.S. Provisional Patent Application No. 60/863,195 filed Oct. 27, 2006. The content of these applications is incorporated herein by reference.

BACKGROUND

The present invention relates to a sonic absorption device for an air pipeline of an aircraft, which sonic absorption device comprises at least one curved pipe section whose respective interior wall is clad with sound absorption material, wherein within the curved pipe section at least one air guidance means is arranged for flow optimisation.

Air pipelines used in aircraft construction are subject to particularly stringent requirements relating to sound protection and flow dynamics. At the same time, air pipelines in an aircraft are to be dimensioned such that flow losses are kept to the minimum possible, for example in order to minimise the energy required for conveying the conditioned air. As a result of the confined space within an aircraft, air pipelines comprise a substantial number of curved pipe sections. In these positions preferably dispersion sound absorbers are used, because they are particularly efficient in these circumstances. Furthermore, the change in direction of the airflow results in turbulence, which among other things reduces the flow speed of the air.

For the purpose of dispersion sound absorption, usually in particular the curved pipe sections of the air pipeline comprise or are lined with a sound absorption material. Furthermore, in particular in the case of highly curved pipe sections, turbulence in the airstream occurs which has a negative effect on efficiency, with air guidance means counteracting said turbulence.

However, a combination of air guidance means and sound absorption cladding in a curved pipe section can have a negative effect on the efficiency of sound absorption. The reason for this is because, for example, two air baffles, arranged parallel in relation to each other, as air guidance means within a curved pipe section produce three separate channel sections which when individually considered, are not fully clad with sound absorption materials. In particular the middle duct, which is formed by two air baffles that are arranged at a distance from each other, is unprotected in this regard.

Attempts have already been made to counteract this problem by using an increase in the bending radius of the curved pipe section so that at the most one air guidance means within the curved pipe section is required. However, this measure requires more installation space within an aircraft, which design space is again at a premium. Furthermore, attempts have already been made to design air guidance means in the form of acoustic separators. An acoustic separator is an aerodynamically shaped air guidance means comprising a wing shape, with the interior space of said separator comprising a filling of a sound absorption material. The connection to the sound absorption material is established by way of conventional perforations of an extent of perforation of approximately 20%. The term "extent of perforation" refers to the area of the surface that is taken up by perforations. While such an acoustic separator itself acts as a sonic absorption device, due to the thickness of the acoustic separator, this solution, however, requires a correspondingly large installation space in the interior of the curved pipe section, which in turn increases the drop in pressure in a disadvantageous manner. Furthermore, it has been shown that an extent of perforation exceeding 10% in itself may form a source of sound.

BRIEF SUMMARY

Accordingly, there may be a need to create a sonic absorption device for a curved pipe section of an air pipeline of an aircraft, which sonic absorption device distinguishes itself by high efficiency while at the same time requiring a minimum of installation space.

The need may be met with a sonic absorption device according to the preamble of claim 1 together with its characterising features. The subsequent dependent claims show advantageous improvements of the invention.

The invention includes the technical teaching that for further weight-neutral sound absorption the air guidance means arranged within a curved pipe section comprises a microperforation on at least one side surface.

The solution according to the invention is associated in particular with an advantage in that, thanks to the microperforation, only a slight turbulence in the airstream arises when said airstream moves along the air guidance means so that the air guidance means does not become a source of noise, or so there is no danger of a significant decrease in pressure occurring. In addition, the aerodynamic behaviour of the microperforated air guidance means according to the invention is similar to that of non-perforated conventional air guidance means. The solution according to the invention thus combines the aerodynamic advantages of conventional air guidance means on the one hand, with optimal sound absorption on the other hand. The coefficient of absorption of the sound absorption solution according to the invention can be set to the required frequency by changing the size and/or the distance of the openings of the microperforation. The measure according to the invention of microperforation of air guidance means has no influence on the weight and design space when compared to those of conventional solutions.

The air guidance means can be of various designs. For example, it is imaginable to design them in the manner of at least one air baffle or in the manner of an acoustic separator. In the former case the microperforations extend through the entire thickness of the air baffle. In the case of an acoustic separator the sheet metal housing enclosing the central absorption core of said separator comprises microperforations in the region of the inside or the outside of the acoustic separator. In the context of this document the term "inside" refers to the inwardly curved surface of the acoustic separator, whereas the term "outside" refers to the outwardly curved surface of the acoustic separator.

According to a further measure improving the invention as far as the acoustic separator is concerned, it is proposed that inside, which has no microperforation, or outside, which has no microperforation, of the sheet metal housing comprises a conventional perforation to an extent of at least 20% perforation. In particular in the case of larger radii of curvature of the curved pipe sections, with this measure it is possible to achieve optimum results with a view to sound absorption and flow guidance. Furthermore, trials have shown that the solution according to the invention is particularly successful in the case of flow speeds exceeding 5 m/s.

The microperforation according to the invention is preferably implemented by individual circular or oval openings with a diameter of less than 1 mm. The microperforations are thus distinct from conventional perforations whose individual openings have a diameter of more than 2 mm. Furthermore, with the microperforation according to the invention an extent of perforation of less than 5% in relation to the entire surface is achieved.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
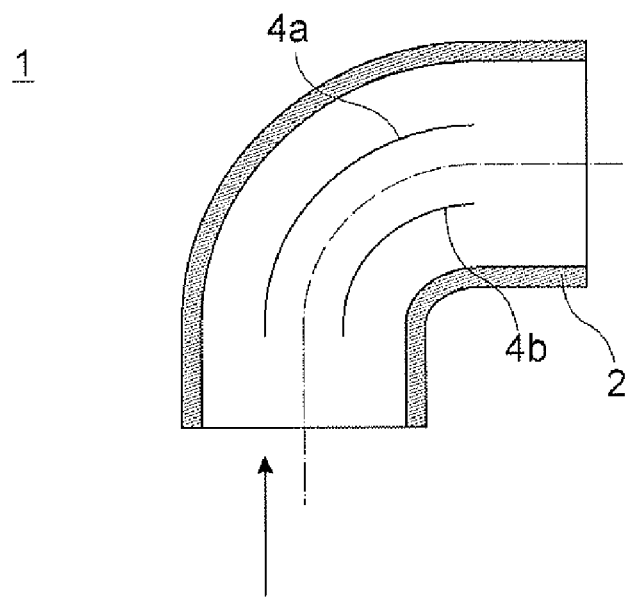
FIG. 1 a lateral view of a curved pipe section with air guidance means in a first embodiment.

According to FIG. 1, conditioned air flows, in the direction shown by an arrow, through a curved pipe section 1 of an air pipeline (not further shown) of an aircraft. The interior wall of the pipe section is lined or clad with a sound absorption material 2, which in the embodiment shown is made from glass wool. Within the curved pipe section 1 two air baffles 4a and 4b, arranged parallel to the airflow, are installed. Over its entire thickness each of the air baffles 4a and 4b comprises through-microperforation for the purpose of sound absorption.

Figure 2:
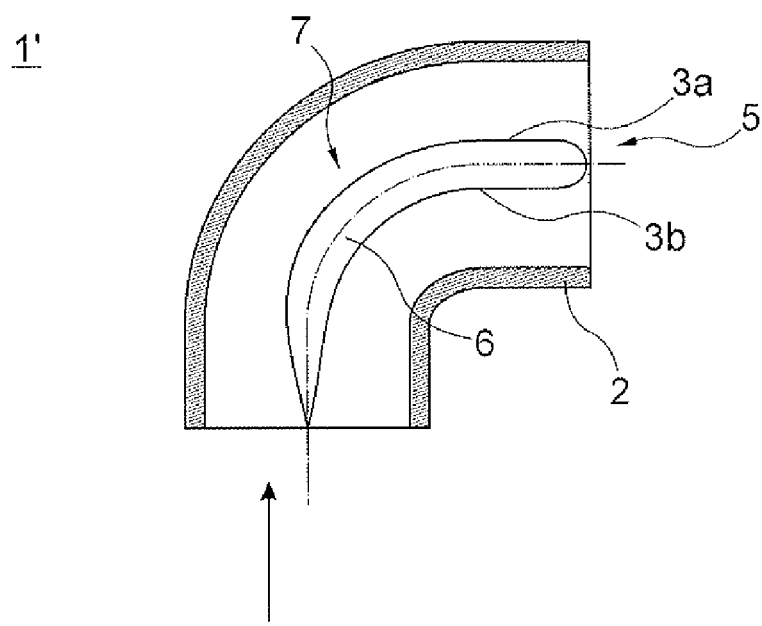
FIG. 2 a lateral view of a curved pipe section with air guidance means in a second embodiment.

According to FIG. 2, in the interior of an also curved pipe section 1' with a lining of sound absorption material 2 an acoustic separator 5 as an air guidance means is arranged. The acoustic separator 5, which is formed in a wing-like manner, comprises an inner absorption core 6 made of sound absorption material, which absorption core 6 is enclosed by a sheet metal housing 7. The sheet metal housing 7 forms the two side surfaces 3a and 3b of the acoustic separator 5, which side surfaces 3a and 3b are approximately opposite each other. In this embodiment the inside of the acoustic separator comprises a microperforation, whereas the outside 3a comprises a conventional perforation.

The invention is not limited to the two preferred exemplary embodiments described above. Instead, modifications thereof are imaginable which are covered by the scope of the following claims of the patent. For example, it is also possible to accommodate the acoustic separator and the air baffles together within a curved pipe section, should this be favoured for aerodynamic or sound-related reasons. The invention is not solely applicable to air pipelines of air conditioning systems, but also to inlet ducts or outlet ducts of turbines or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A sonic absorption device for an air pipeline of an aircraft, which sonic absorption device comprises at least one curved pipe section whose respective interior wall is clad with a sound absorption material, wherein within the curved pipe section at least one air guidance is arranged for flow optimisation, wherein the air guidance is arranged as an acoustic separator having a sheet metal housing enclosing a central absorption core and comprising an inner side surface and an outer side surface, wherein the inner side surface and the outer side surface are perforated, wherein exclusively the perforation of the inner side surface or of the outer side surface is a microperforation, and wherein a non-microperforated inner side surface or outer side surface of the sheet metal housing comprises a conventional perforation to an extent of at least 20% perforation.

2. The sonic absorption device of claim 1, wherein the sound absorption material comprises glass wool, mineral wool or open-pore foam.

3. The sonic absorption device of claim 1, wherein the microperforation comprises individual openings with a diameter of less than 1 mm.

4. The sonic absorption device of claim 1, wherein the extent of perforation of the microperforation is less than 5%.

5. The sonic absorption device of claim 1, wherein the device is adapted for absorbing sounds at flow speeds through the curved pipe section during normal operation exceeding 5 m/s.

6. A sonic absorption device for use with an air pipeline of an aircraft, the sonic absorption device comprising:
 a curved pipe section having an interior wall and a hollow central portion formed by the interior wall; and
 an air guidance mounted within the hollow central portion, the air guidance having a sheet metal housing enclosing a central absorption core, the sheet metal housing having an inner side surface and an outer side surface, wherein the inner side surface has a plurality of inner side perforations and wherein the outer side surface has a plurality of outer side perforations, wherein each inner side perforation has a first dimension, wherein each outer side perforation has a second dimension, and wherein the first dimension substantially differs from the second dimension.

7. The sonic absorption device of claim 6, wherein the first dimension is smaller than the second dimension.

8. The sonic absorption device of claim 6, wherein the second dimension is smaller than the first dimension.

9. The sonic absorption device of claim 6, wherein the plurality of inner side perforations comprises microperforations.

10. The sonic absorption device of claim 9, wherein each microperforation has a diameter of less than 1 mm.

11. The sonic absorption device of claim 9, wherein the plurality of outer side perforations comprises conventional perforations.

12. The sonic absorption device of claim 6, wherein the plurality of outer side perforations comprises microperforations.

13. The sonic absorption device of claim 12, wherein each microperforation has a diameter of less than 1 mm.

14. The sonic absorption device of claim 12, wherein the plurality of inner side perforations comprises conventional perforations.

15. The sonic absorption device of claim 6, wherein the interior wall of the curved pipe section is clad with a sound absorption material.

16. A sonic absorption device for use with an air pipeline of an aircraft that includes a curved pipe section having an interior wall and a hollow central portion formed by the interior wall, the sonic absorption device comprising:

an air guidance configured for mounting within the hollow central portion, the air guidance having a sheet metal housing enclosing a central absorption core, the sheet metal housing having an inner side surface and an outer side surface, wherein the inner side surface has a plurality of inner side perforations and wherein the outer side surface has a plurality of outer side perforations, wherein each inner side perforation has a first dimension, wherein each outer side perforation has a second dimension, and wherein the first dimension substantially differs from the second dimension.

17. The sonic absorption device of claim 16, wherein the first dimension is smaller than the second dimension.

18. The sonic absorption device of claim 16, wherein the second dimension is smaller than the first dimension.

19. The sonic absorption device of claim 16, wherein the plurality of inner side perforations comprises microperforations.

20. The sonic absorption device of claim 16, wherein the plurality of outer side perforations comprises microperforations.

* * * * *